(12) United States Patent
Greenlee

(10) Patent No.: US 10,218,187 B1
(45) Date of Patent: Feb. 26, 2019

(54) SIGNAL MODULATOR AND METHOD OF USE

(71) Applicant: Jonathan Greenlee, Saint Paul, MN (US)

(72) Inventor: Jonathan Greenlee, Saint Paul, MN (US)

( * ) Notice: Subject to any disclaimer, the term of this patent is extended or adjusted under 35 U.S.C. 154(b) by 359 days.

(21) Appl. No.: 15/074,341

(22) Filed: Mar. 18, 2016

(51) Int. Cl.
*H02J 5/00* (2016.01)

(52) U.S. Cl.
CPC .................. *H02J 5/005* (2013.01)

(58) Field of Classification Search
CPC .......................................... H02J 5/005
USPC ........................................... 307/104
See application file for complete search history.

(56) References Cited

U.S. PATENT DOCUMENTS

| | | | | |
|---|---|---|---|---|
| 9,711,968 B2* | 7/2017 | Kim | .................. | H02J 5/005 |
| 2010/0301678 A1* | 12/2010 | Kim | .................. | H02J 5/005 307/104 |
| 2011/0227420 A1* | 9/2011 | Urano | .................. | H02J 17/00 307/104 |
| 2012/0153739 A1* | 6/2012 | Cooper | .................. | H02J 5/005 307/104 |
| 2012/0161696 A1* | 6/2012 | Cook et al. | ........... | B60L 11/182 320/108 |
| 2014/0312705 A1* | 10/2014 | Hatanaka | ................ | H02J 17/00 307/104 |
| 2015/0222148 A1* | 8/2015 | Sampei | .................. | H02J 5/005 307/104 |
| 2016/0105033 A1* | 4/2016 | Jeong | .................. | H02J 50/12 307/104 |
| 2016/0118845 A1* | 4/2016 | Yeo | .................. | H02J 50/12 320/108 |
| 2017/0018977 A1* | 1/2017 | Van Wageningen | .... | H02J 5/005 |

* cited by examiner

Primary Examiner — Jason C Olson

(57) ABSTRACT

A signal modulator and method of use which provides means to dynamically vary the power supplied to a signal processing circuit, imbuing the output signal of the signal processing circuit with additional desirable modulation and distortion above and beyond what is typically produced by the signal processing circuit.

8 Claims, 8 Drawing Sheets

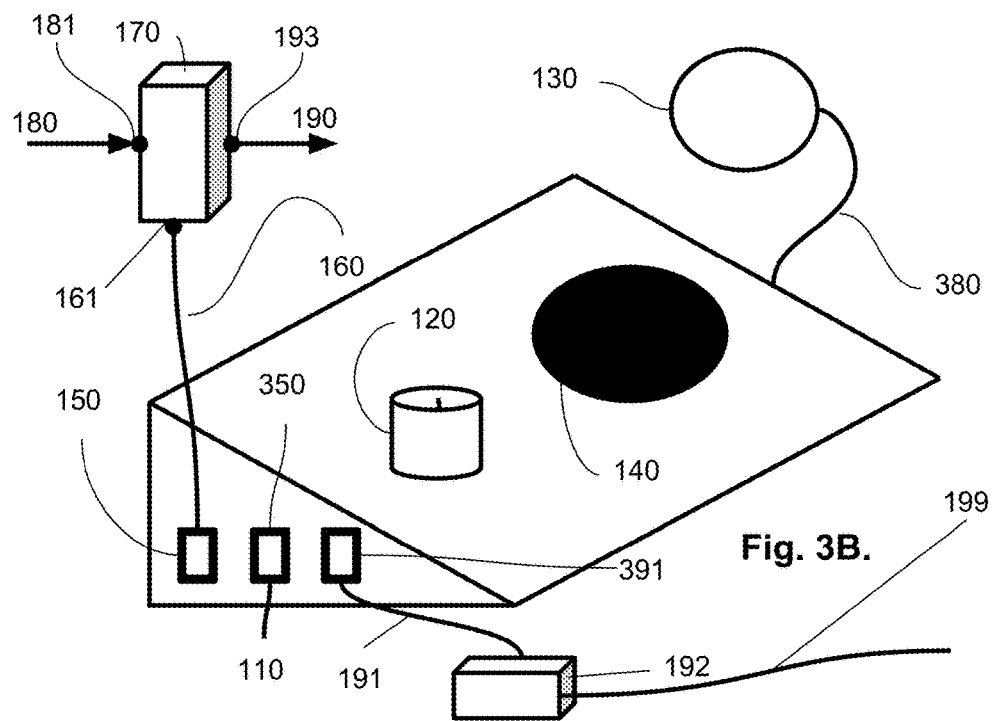
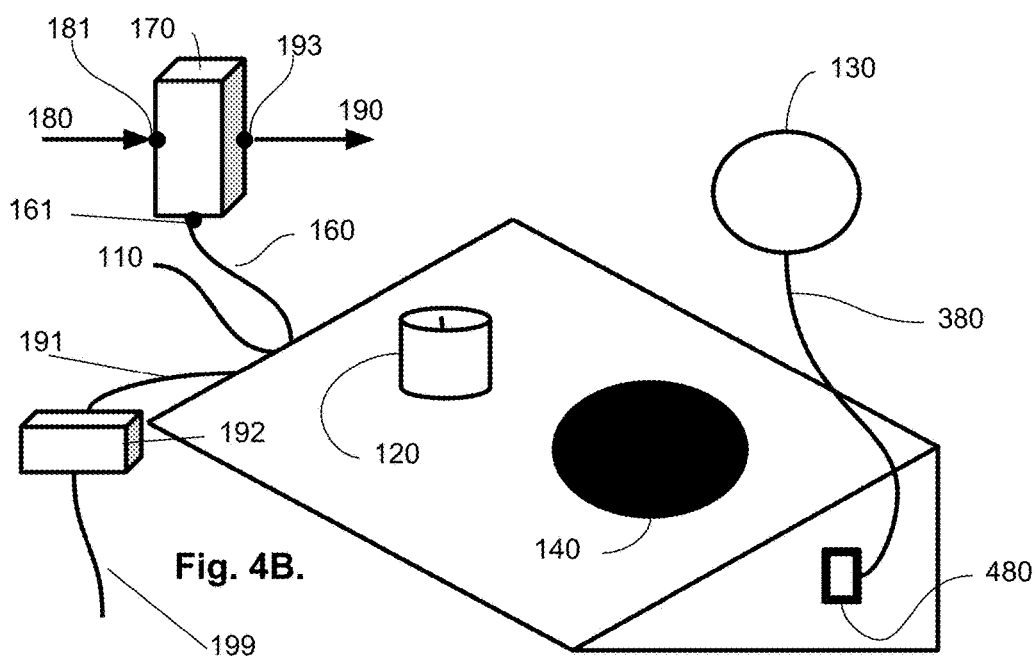

SIGNAL MODULATOR AND METHOD OF USE

BACKGROUND —PRIOR ART

Audio and video production is essential to the creative process in many disciplines, such as film, video game development, and performing arts. Professionals and hobbyists in these disciplines are always looking for new tools and methods to manipulate audio and video signals to create desirable changes to these signals. Sometimes, in moments of exploration or desperation, tools are operated outside of their typical operating parameters, causing unexpected performance. History has shown us that this is not always bad. Guitar pedals, such as the fuzz pedal or the wah-wah pedal, emerged from the realization that creating deliberate distortion or modulation in an audio signal by causing a portion of the audio signal path to, for example, operate outside of specification, be deliberately degraded, or attenuated, can cause desirable results.

Over many years, many different signal processing circuits and manipulation techniques have been developed and are in use today. Similar signal processing circuits and manipulation techniques are also used by the video production community to cause desirable results in video signals.

A commonality of these signal processing circuits is the need for electrical power. Several solutions for this power requirement are in place today. Some of these solutions include batteries, and step down transformers, typically used to convert alternating current from a wall outlet to low voltage direct current for use by a low power signal processing circuit, or a low-voltage alternating current for further manipulation by the signal processing circuit.

Nearly all such power supplies used by signal processing circuits are not controllable by the user. Making changes to the power supply can damage some types of equipment. Therefore, the power supplies that are user controllable are typically restricted to changing only the output voltage in order to precisely match or step down the available power to the power requirements of the signal processing circuit, generally by operating a switch on the power supply that taps into the outputs of different secondary wires in the associated power transformer. Furthermore, it is generally the case that a power supply commercially provided with a given signal processing circuit will provide a fixed voltage and peak current rating in an attempt to keep the signal processing circuit operating at peak performance without requiring additional configuration from the end user.

Because of all this, users do not attempt to operate signal processing equipment with mismatched or underpowered power supplies, and if they do, it is generally the result of accidentally grabbing the wrong power supply, or accidentally setting the output voltage incorrectly on a variable power supply, or mistakenly grabbing a dead battery. In all of these cases the signal processing equipment usually does not work as expected, if at all.

However it is also notable that many signal processing circuits have designs that permit them to operate within a range of currents and voltages, albeit with potentially degraded performance. A good example of such tolerance is a battery powered guitar pedal with a dying battery installed. When the battery finally dies, it does not destroy the guitar pedal, rather the design of the signal processing circuit within the guitar pedal is able to withstand the battery dying. I have found that the signal travels through an additional palette of changing timbres, above and beyond the palette of timbres produced by the signal processing circuit operating normally, as the battery dies. This is because the dying battery is increasingly depriving the signal processing circuit of the power needed for typical operation, which I have found produces an additional desirable result in many signal processing circuits. Unfortunately, the result is often short lived and not appropriately controllable, offering limited creative exploration of this phenomena.

SUMMARY OF THE INVENTION

In accordance with one embodiment a signal modulator and its method of use.

ADVANTAGES

Accordingly, several advantages of one or more aspects are as follows: to provide signal modulators, that can be used to dynamically vary the power supplied to a signal processing circuit, that imbue the output signal of a signal processing circuit with additional desirable modulation and distortion above and beyond what is typically produced by the signal processing circuit, that provide a means to vary the power supplied to a signal processing circuit by way of a method that incorporates wireless power transmission and expressive motion, that provide a means to vary the power supplied to a signal processing circuit by modulating a variable load, that provide a means to vary the power supplied to a signal processing circuit by modulating a variable load with a control signal. Other advantages of one or more aspects will be apparent from a consideration of the drawings and ensuing description.

DRAWINGS—FIGURES

FIG. 3B shows a perspective view of an enclosure showing various aspects of a signal modulator with a single wireless power transmitter and a variable load in accordance with one embodiment.

FIG. 4B shows another perspective view of an enclosure showing various aspects of a signal modulator with a single wireless power transmitter and a variable load in accordance with one embodiment.

Figure 1A:
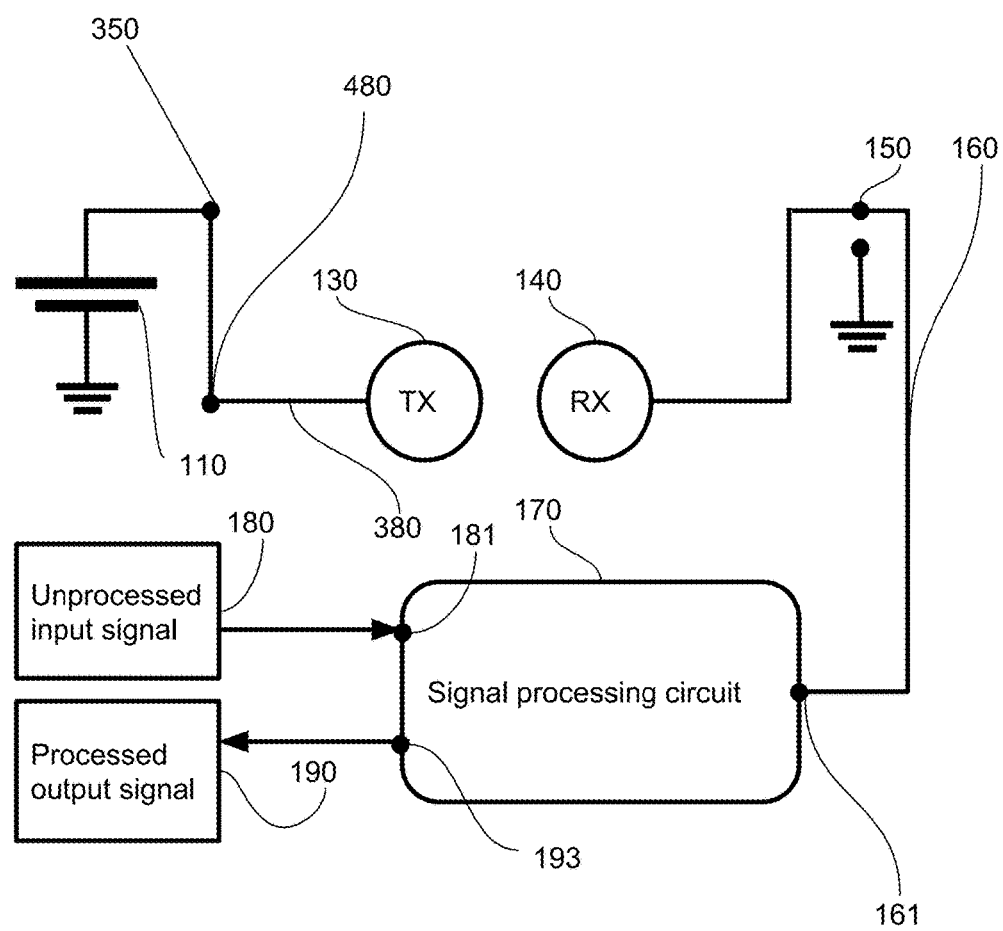
FIG. 1A shows a diagram of a signal modulator with a single wireless power transmitter present in accordance with one embodiment.

DRAWINGS—REFERENCE NUMERALS 110 primary power supply
120 variable load
130 wireless power transmitter
140 wireless power receiver
150 power output connection
160 signal processing circuit power input cable
161 signal processing circuit power input connection
170 signal processing circuit
180 unprocessed input signal
181 input signal connection
190 processed output signal
191 variable load control signal
192 control signal controller
193 output signal connection
199 external master clock signal
260 additional wireless power transmitter
270 additional power supply
350 primary power supply input connection
380 tethered power connection to wireless power transmitter
391 control signal input connection
480 connection jack for wireless power transmitter tether cable
590 human hand

DETAILED DESCRIPTION—FIRST EMBODIMENT

FIGS. 1A, 3A, 4A

Figure 3A:
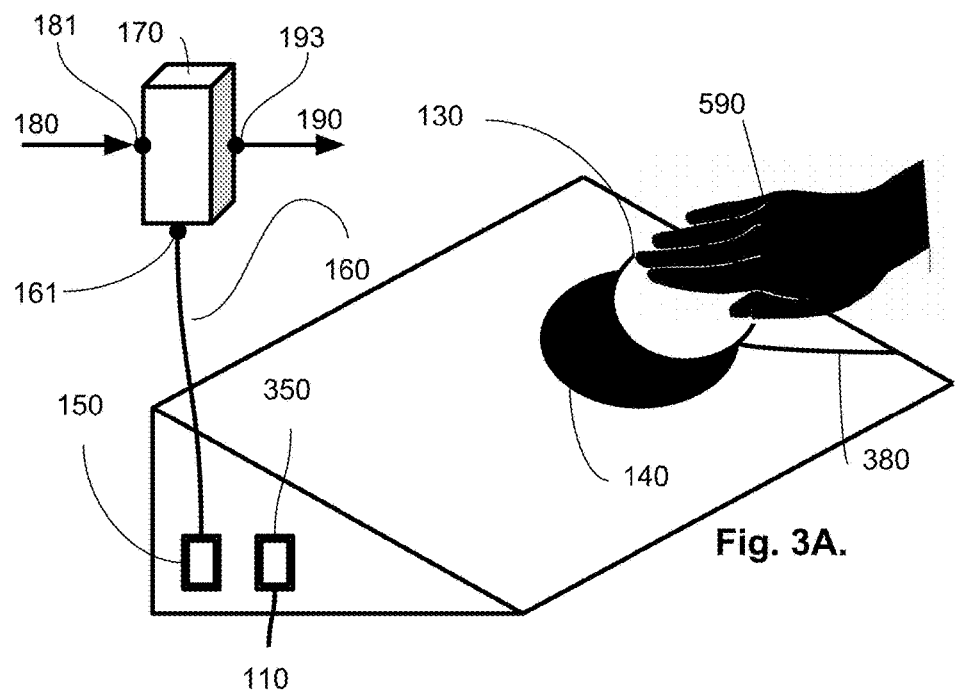
FIG. 3A shows a perspective view of an enclosure showing various aspects of a signal modulator with a single wireless power transmitter and a method of use in accordance with one embodiment.
Figure 4A:
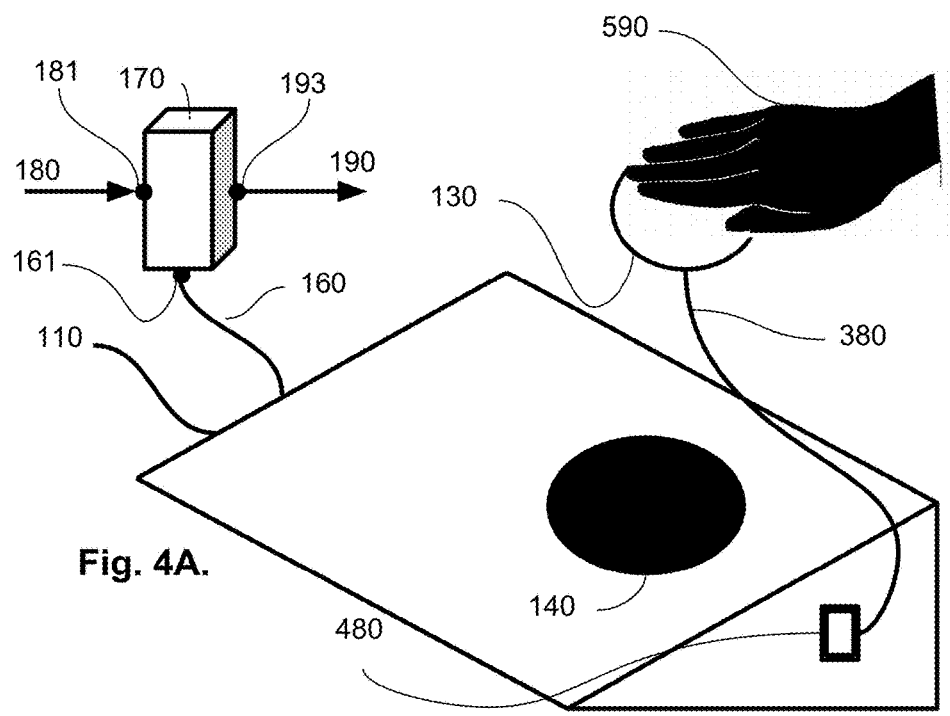
FIG. 4A shows another perspective view of an enclosure showing various aspects of a signal modulator with a single wireless power transmitter and a method of use in accordance with one embodiment.
Figure 5:
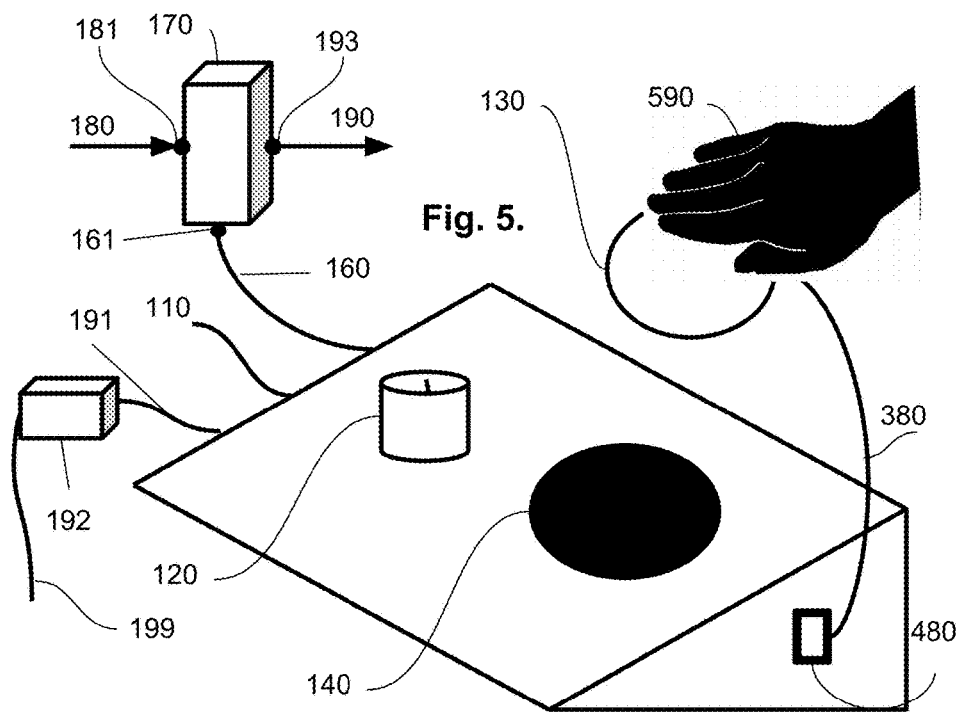
FIGS. 5 and 6 are perspective views of an enclosure showing various aspects of a signal modulator with a single wireless power transmitter and a method of use in accordance with one embodiment.
Figure 6:
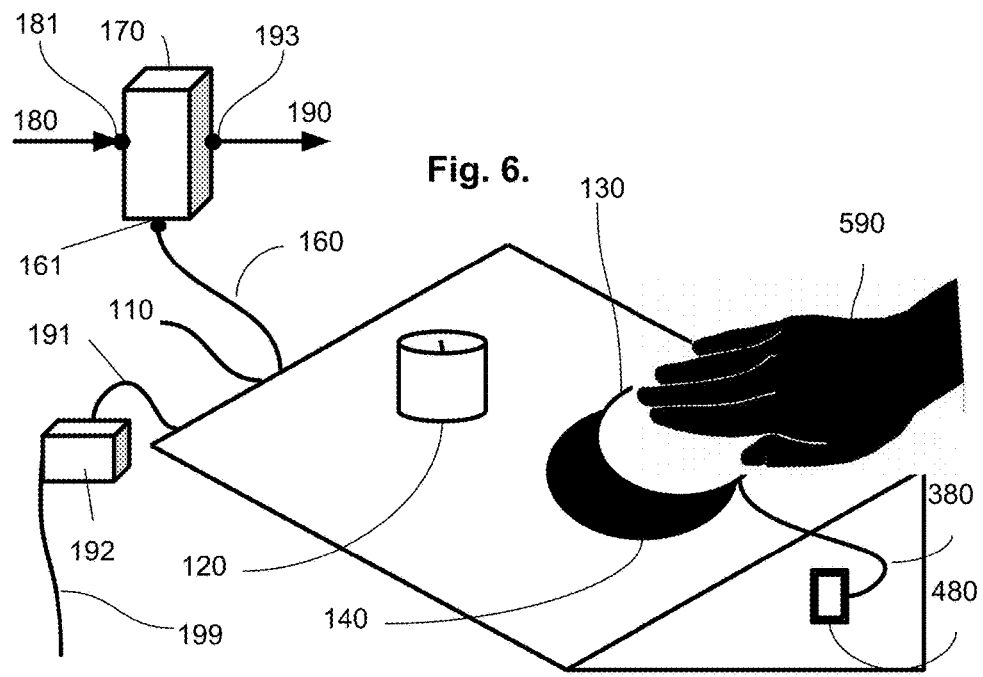

One embodiment of the signal modulator is illustrated in FIG. 1A (diagram), FIG. 3A (top view), FIG. 4A (reverse top view). In FIG. 1A there is shown a primary power supply 110 which is typically a 5-12V DC power supply such as a battery, or a "wall wart" AC power adapter. The primary power supply 110 is a power supply that meets the typical power requirements of the signal processing circuit 170. The primary power supply 110 connects to a primary power supply input connection 350, which then connects to a connection jack for wireless power transmitter tether cable 480, which then connects to a tethered power connection to wireless power transmitter 380, which then connects to a wireless power transmitter module 130. The wireless power transmitter 130 typically accepts a range of 5V-12V DC as input. Note: wireless power transmitter/receiver sets are commonly available commercially and come in a variety of designs and power ratings, typically offering you a range of supported input voltages (typically 9-12V DC), a target output voltage (typically 5-9V DC), and a maximum output amperage (typically 300-800 mA). These specified typical values could change depending on the needs of the target signal processing circuit, but are satisfactory in many cases. The circuit continues with a wireless power receiver 140 which is connected to a power output connection 150. The power output connection 150 is connected to a signal processing circuit power input cable 160, which connects to a signal processing circuit power input connection 161 which provides power to a signal processing circuit 170. The signal processing circuit 170 is supplied with an unprocessed input signal 180, which it receives at the input signal connection 181. The signal processing circuit processes the signal, and outputs a processed output signal 190 by way of the output signal connection 193.

In FIGS. 3A and 4A there are shown perspective views of an embodiment of the signal modulator. The wireless power transmitter 130 is shown being held by the human hand 590, although another human body part such as a foot would be satisfactory. In FIG. 3A the wireless power transmitter 130 is shown in close proximity to the wireless power receiver 140, and in this configuration power flows easily from the wireless power transmitter 130 to the wireless power receiver 140. Next, the output from the wireless power receiver 140 connects to the power output connection 150. The power output connection 150 is connected to the signal processing circuit power input cable 160 which is connected to the signal processing circuit power input connection 161 which provides power to the signal processing circuit 170. The signal processing circuit 170 is supplied with an unprocessed input signal 180, which it receives at the input signal connection 181. The signal processing circuit processes the signal, and outputs a processed output signal 190 by way of the output signal connection 193. In this embodiment it would be satisfactory to use a commercially available guitar pedal such as an Electro-Harmonix Mini Q-Tron for the signal processing circuit 170.

Operation—FIGS. 1A, 3A, 4A

In this embodiment, the manner of using the power controller is for one to hold a wireless power transmitter 130 in a human hand 590 (although another holding instrument would be satisfactory), and then move the wireless power transmitter 130 toward and then away from a wireless power receiver 140. In FIG. 3A we show the wireless transmitter 130 being held by the human hand 590 in close proximity to the wireless power receiver 140. In FIG. 3B we show the wireless power transmitter 130 being held away from the wireless power receiver 140. When these wireless power devices are brought increasingly close together, power increasingly flows from the wireless power transmitter 130 to the wireless power receiver 140, causing an increasing flow of current to the power output connection 150 and into the signal processing circuit power input cable 160 which connects to the signal processing circuit power input connection 161, and provides increasing power to the signal processing circuit 170, causing additional desirable and perceptible modulation in the processed output signal 190. Next, as the distance between the wireless power transmitter 130 and the wireless power receiver 140 increases, the current that is received by wireless power receiver 140 falls, causing additional desirable and perceptible modulation in the processed output signal 190. The rate at which this current changes is strongly affected by the vector of movement of the wireless power transmitter 130 in relation to the wireless power receiver 140. This vector of movement can be controlled in a highly expressive way because manipulating the wireless power transmitter 130 with a human hand 590 (or other holding instrument) allows for very fine motor movements, allowing for artistic input into the additional desirable and perceptible modulation in the processed output signal 190. The results have significant applications in a signal processing environment.

FIGS. 1B, 3B, 4B, 5, 6, 9, 10—Description of Variable Load Version

Figure 1B:
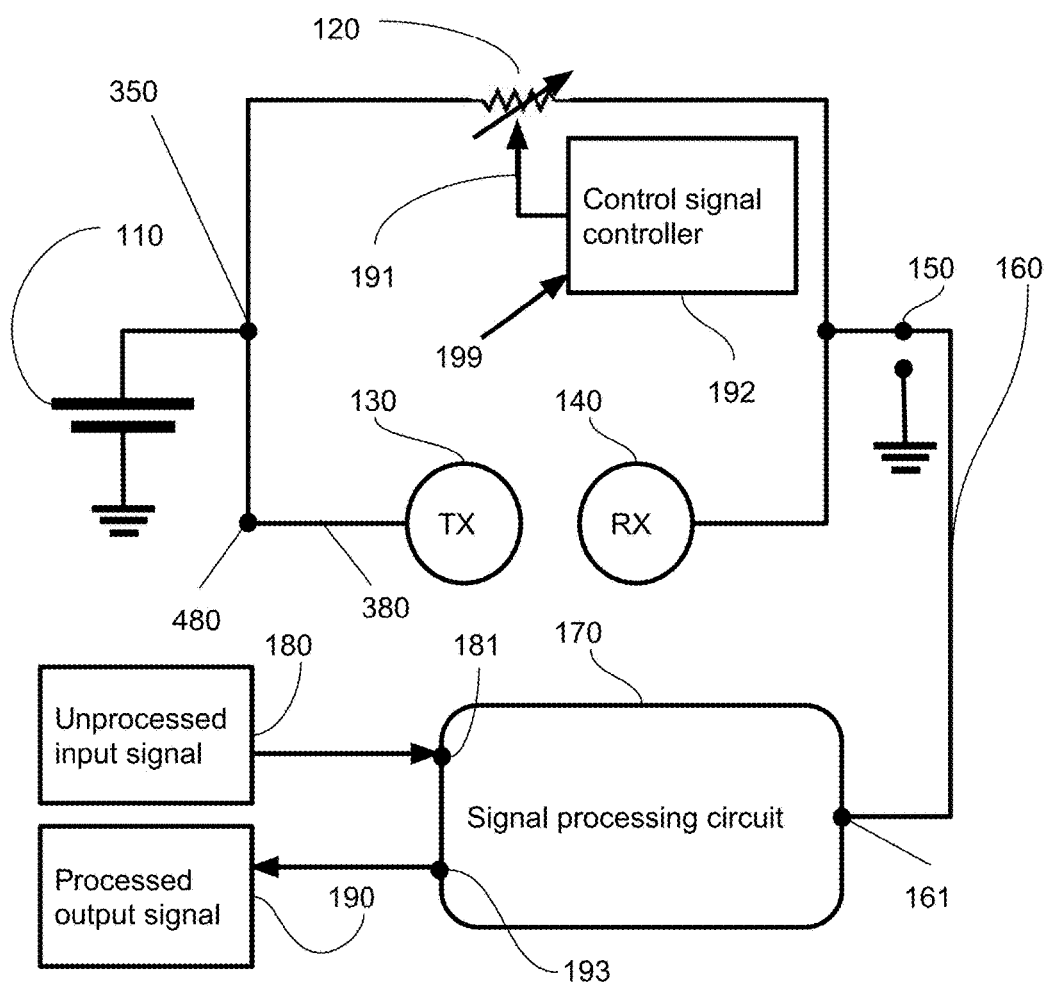
FIG. 1B shows a diagram of a signal modulator with a single wireless power transmitter and a variable load in accordance with another embodiment.

Additional embodiments are shown in FIGS. 1B, 3B, 4B, 5, and 6. In FIG. 1B, we see a variable load 120 has been placed in a parallel configuration to the wireless power transmitter 130 and wireless power receiver 140. The variable load 120 is an electrical system that provides a load such as a variable resistor, a large bank of programmable LED lights, or a motor. The variable load 120 can be manipulated by a holding instrument such as a human hand 590, or by a control signal 191. One satisfactory choice in this embodiment for the variable load 120 would be a potentiometer with a knob as shown in FIG. 3B. Another satisfactory choice for the variable load 120 is a fader such as the type used in audio mixing consoles. Another satisfactory choice for the variable load 120 would be a photoresistor. Although these electrical components are morphologically different, they each offer a way to physically manipulate the setting of the variable load 120. Thus a potentiometer, fader, variable resistor, photoresistor, or some other equivalent constitute a means for physically manipulating a variable load 120.

Optionally, if more advanced control is desired, a control signal controller 192, such as a computer, is used to generate control signals that manipulate the variable load 120. This is done by the control signal controller 192 sending the appropriate control signals to the variable load 120 through the control signal input connection 391. One satisfactory choice for the variable load 120 that would be manipulable by such a control signal would be a digital potentiometer. Often it is the case that a digital potentiometer can be operated by both a human hand 590 and a control signal 192, which would be satisfactory.

FIGS. 1B, 3B, 4B, 5, 6, 9, 10—Operation of Variable Load Version

In this embodiment, the variable load 120 is an alternate path for the current to take. This alternate path allows current to pass through the circuit from the primary power input 110 to the power output connection 150 through the variable load 120, even in cases where the wireless power transmitter 130 is not actively transmitting power to the wireless power receiver 140. Conversely, the variable load 120 can be set to restrict partially, or completely, the current passing across the variable load 120, such that only the current passing from the wireless power transmitter 130 to the wireless power receiver 140 makes it to the power output connection 150.

Because it is the case that different signal processing circuits have different minimum power requirements in order to engage their signal processing function and produce a processed output signal 190, and because is also the case that some signal processing circuits emit clicks, pops, or noise as they disengage their signal processing function when the current falls below a minimum value, the variable load 120 provides a means to allow the signal processing circuit to be supplied at all times with at least a minimum amount of power, while still offering the user the ability to use the wireless power transmitter 130 and wireless power receiver 140 to further modulate the total power sent to the power output connection 150, without the risk of disengaging the signal processing function of the signal processing circuit 170. A satisfactory usage of the variable load 120 in this embodiment is to select a load where the signal processing circuit 170 is producing at least a minimum amount of processed output signal 190. At this point the variable load 120 may be left alone, and the user may manipulate the distance between the wireless power transmitter 130 and wireless power receiver 140 to cause further modulation in the processed output signal 190.

In another embodiment, the variable load 120 responds to signals sent by the control signal controller 192, and alters performance accordingly. The control signal controller 192 emits, per the manufacturer specifications of the variable load 120, a control signal 191 that is connected to the control signal input connection 391, which is then connected to the control signal input of the variable load 120, causing a change in load.

An example of satisfactory behavior from the control signal controller 192 would be producing a control signal 191 effectively performing LFO modulation, effectively performing step sequencer styled modulation, effectively performing synchronization to automation signals from an audio/video digital workstation, or effectively responding to a complete or partial virtual interface presented on a smartphone or computer.

Figure 9:
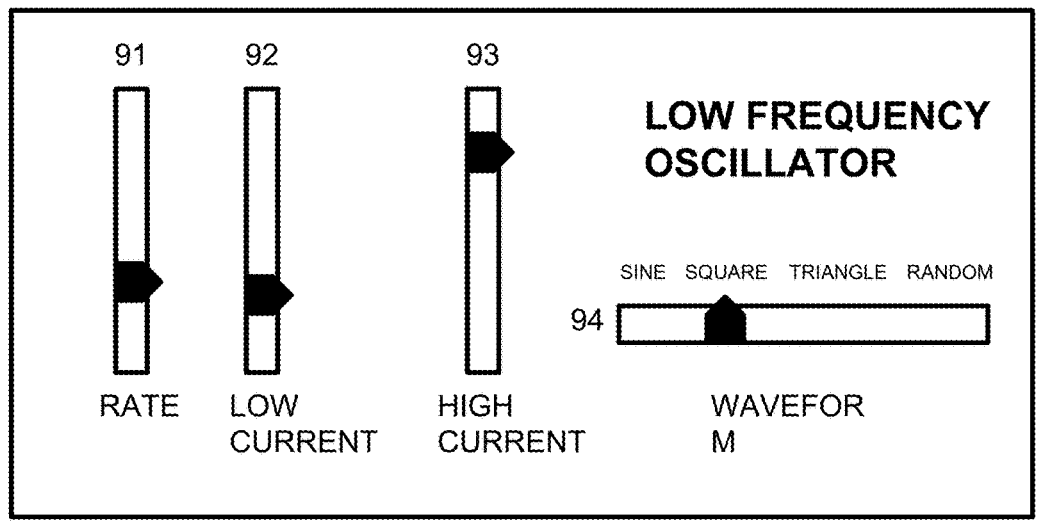
FIGS. 9 and 10 show various aspects of a control signal controller for a control signal for a variable load in accordance with another embodiment.

FIG. 9 shows an embodiment of such an LFO interface for the control signal controller 192. The LFO interface has several user configurable settings, including a rate 91, a low current 92, a high current 93, and a waveform 94. The control signal controller 192 outputs the control signal 191 to the variable load 120 that causes the load to oscillate between the values set by the low current 92 and the high current 93, at the rate set by the rate 91, following the chosen wave shape of the waveform 94. This would be a satisfactory and familiar interface for many users, and could be presented physically with actual knobs and faders, or virtually using an interface application running on an operationally connected smartphone, computer, or future equivalent. However it would also be satisfactory to offer a simple, non-configurable LFO interface with a fixed setting for any or all of the values selected from the group consisting of rate 91, low current 92, high current 93, and waveform 94.

Figure 10:
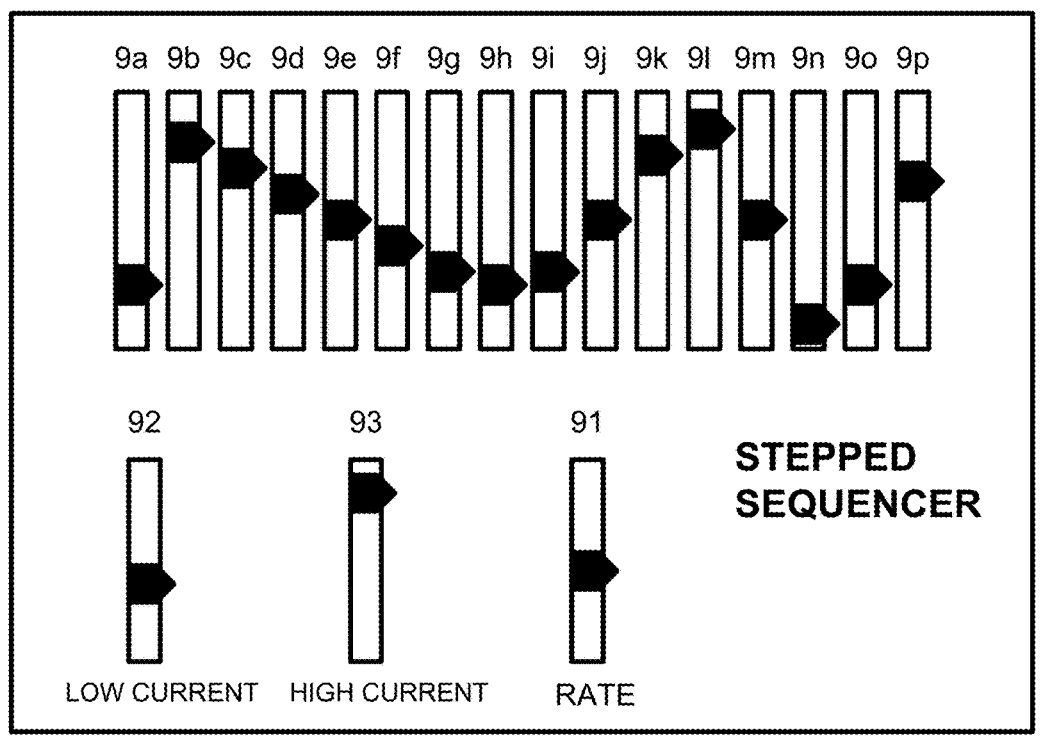

FIG. 10 shows a step sequencer interface for the control signal controller 192. The step sequencer interface shown here has 16 steps, labeled 9a through 9p, which can be individually set. Sixteen is a common number for a step sequencer, although any number of steps would be satisfactory, with multiples of four being most common. Each step has a value which translates to a load in the variable load 120. The maximum value of each step is set by the high current 93 control, and the minimum value of the steps is set by the low current 92 control. The values for each step 9a through 9p are set, and then performed sequentially, forward or backwards, at a rate set by the rate 91. The rate 91 is set either by operating a physical interface, or in response to instruction from the control signal controller 192. The control signal controller optionally receives clock information from an external master clock by way of the external master clock signal 199, allowing the rate 91 to reflect synchronization to external clock information.

Another satisfactory implementation of the variable load 120 responding to a control signal 191 is the task of following automation being produced by an audio/video digital workstation. In this case the audio/video workstation is the control signal controller 192, and it emits a control signal 191 which changes the load in the variable load 120 in order to induce additional modulation to follow a beat, or follow a change in a video signal, or another cue.

Although the control signal 191 encoding may vary from manufacturer to manufacturer of the variable load 120, particularly given the rapid rate of technological development in electronic hardware and accompanying software, the function of the control signal controller 192 remains the same; to produce a control signal 191 that changes the load in the variable load 120 in order to cause additional modulation in the processed output signal 190.

Figure 2:
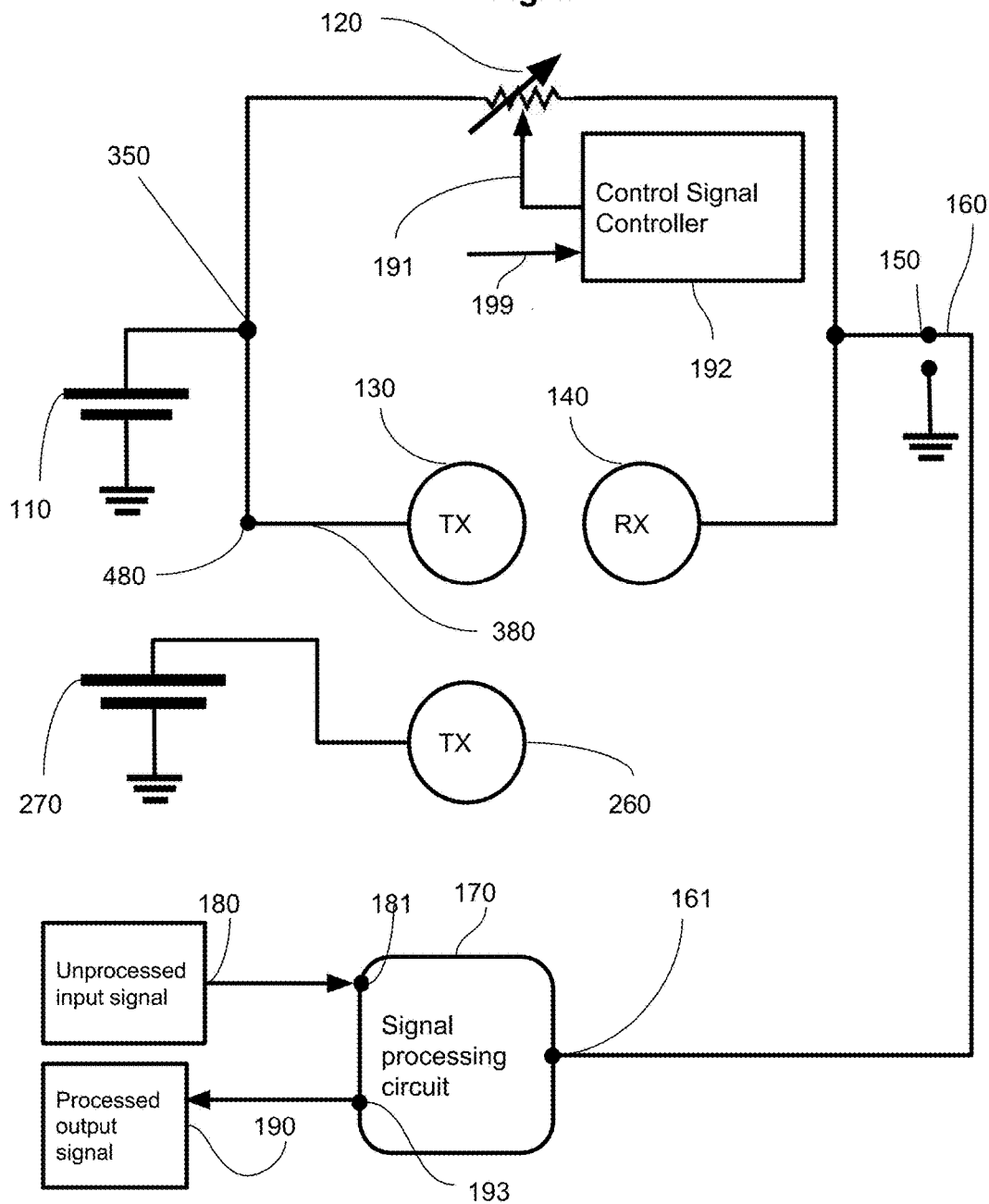
FIG. 2 shows a diagram of a signal modulator with two wireless power transmitters and a variable load present in accordance with another embodiment.
Figure 7:
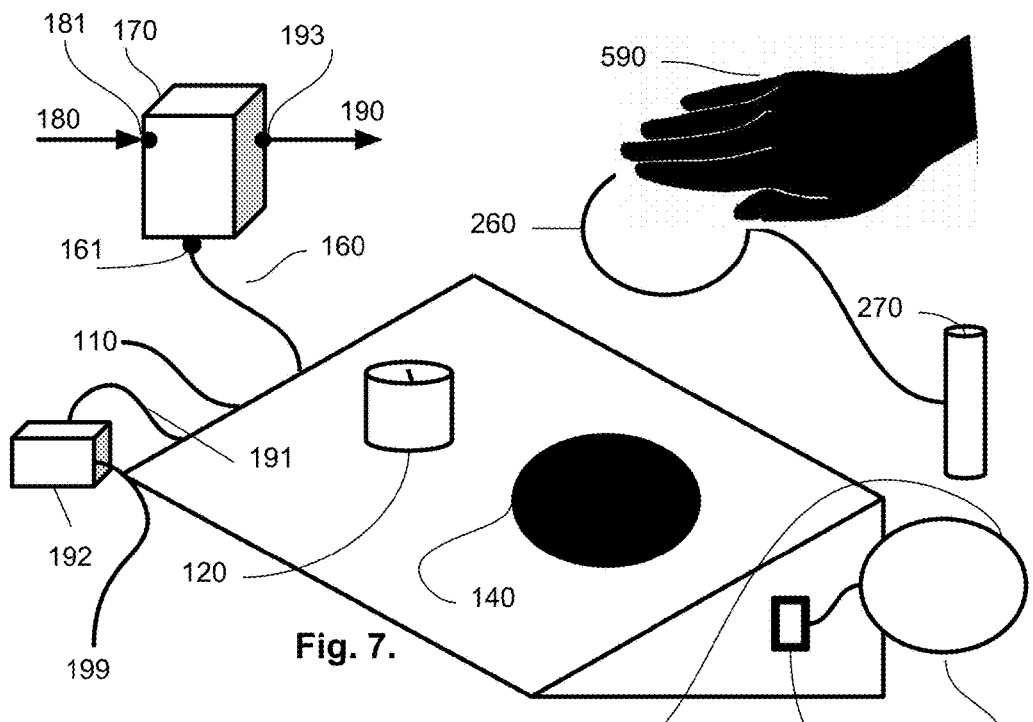
FIGS. 7 and 8 are perspective views of an enclosure showing various aspects of a signal modulator with multiple wireless power transmitters and a method of use in accordance with another embodiment.
Figure 8:
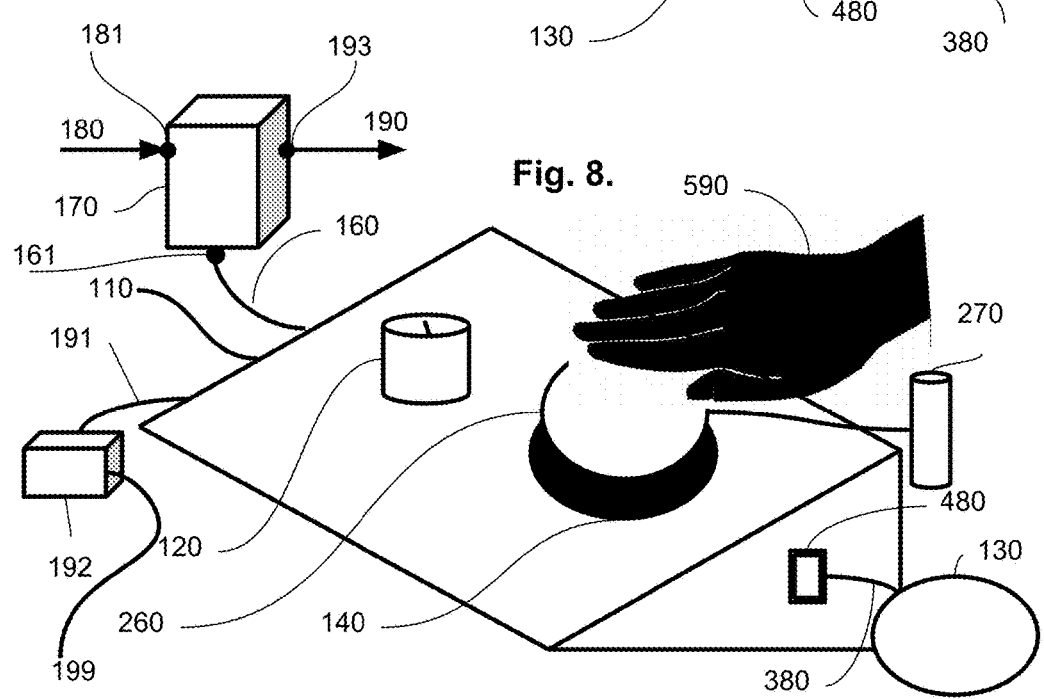

Thus, the control signal controller 192, the control signal input connection 391, and the control signal 191, constitute a means to electronically manipulate the variable load 120. FIGS. 2, 7, and 8—Description of Additional Wireless Transmitter Version.

FIGS. 7 and 8 are perspective views of an enclosure showing an embodiment of a signal modulator with an additional wireless power transmitter 260. The additional wireless power transmitter 260 is connected to an additional power supply 270, such as a battery. There may be multiple additional wireless transmitters and multiple additional power supplies. FIG. 2 shows a diagram of this embodiment.
FIGS. 2, 7, 8—Operation of Additional Wireless Transmitter Version In another embodiment, the additional wireless transmitter 260 can also be used to transmit power from the additional power supply 270 to the wireless power receiver 140, in a similar manner to how the wireless power transmitter 130 transmits power from the primary power supply 110; namely by increasing and decreasing the distance between the additional wireless transmitter 260 and the wireless power receiver 140. A significant difference is that the additional wireless transmitter 260 is not tethered to the main circuit like the wireless power transmitter 130, and is powered by an additional power supply 270 which could be a battery or other freestanding power supply, allowing the user to escape the limited movement caused by the tethered power connection to wireless power transmitter 380. This allows the user great freedom of movement while wielding the additional wireless transmitter 260. It is satisfactory that gloves, wands, rings and other devices may be constructed, each outfitted with an additional wireless power transmitter 260 and an additional power supply 270, and at least each used creatively to transmit power from the additional power supply 270 to the wireless power receiver 140.

CONCLUSION, RAMIFICATIONS, AND SCOPE

Thus the reader will see that at least one embodiment of the signal modulator provides a plurality of new signal processing options both to owners of signal processing circuits, and to manufacturers of signal processing circuits looking to license and add this functionality into their own products.

The desire of the signal processing community for new tools is intense, and embodiments that incorporate human body motion will strongly resonate with an artistic community that laments the decline or loss of tactile controllers, such as faders, knobs, and buttons. Such tactile controllers have largely been replaced with mouse clicks, and therefore these embodiments provide increasingly rare tactile interactivity to a community of active purists and sentimentalists, as well as new technology for the wildly creative to distort signals in brave new ways.

While my above description contains many specificities, these should not be construed as limitations on the scope, but rather as an exemplification of one [or several] embodiments thereof. Many other variations are possible. For example, another version with multiple wireless power receivers is possible and notable, where the wireless power receiver 140 is wired in parallel to another wireless power receiver 140, potentially multiple times, in order to increase the area of power reception. Another version where some or all of the control signal controller 192 is housed in immediate proximity to the variable load 120 and receives instruction from an external control surface such as a smart phone via a wireless protocol such as Bluetooth is possible, thereby eliminating the need for an external physical connection for the control signal 191. A rack-mountable version might be used by production studios who would wish to keep floor space open or wish the device to be located near a studio clock in order to supply the external master clock signal 199.

A version where the wireless power transmitter 130 and the wireless power receiver 140 were exchanged, where the wireless power receiver 140 was actively manipulated by the human hand 590, or another body part, is possible. A version where both the wireless power transmitter and the wireless power receivers were affixed to long cables allowing each to be installed in a glove or wand or implement, freeing both from attachment to an enclosure, is possible. The means by which to bring a wireless power transmitter 130 or additional wireless power transmitter 260 into proximity to at least one wireless power receiver 140 for the purpose of creating additional modulation in the output signal of a signal processing circuit are varied and rich, and many hardwired and wireless interpretations of the signal processing concept are possible and appealing.

Accordingly, the scope should be determined not by the embodiments illustrated, but by the appended claims and their legal equivalents

I claim:
1. A method of modulating a signal passing through a signal processing circuit comprising:
   providing a primary power supply and connecting an output of said primary power supply to an input of at least one wireless power transmitter at a first connection; and
   connecting a power output from at least one wireless power receiver to a power input of said signal processing circuit at a second connection; and
   positioning said wireless power transmitter at a distance from said wireless power receiver such that said wireless power receiver is receiving power from said wireless power transmitter; and
   increasing said distance between said wireless power transmitter and said wireless power receiver, thereby reducing power transmitted to said signal processing circuit; and
   decreasing said distance between said wireless power transmitter and said wireless power receiver, thereby increasing power transmitted to said signal processing circuit; and
   providing at least one parallel circuit that contains a variable load wherein said parallel circuit is coupled between said first connection and said second connection; and
   providing an unprocessed input signal into said signal processing circuit, wherein said signal processing circuit modulates said input signal based at least on the power transmitted to said signal processing circuit; and
   providing a processed output signal from said signal processing circuit.
2. The method of modulating a signal passing through a signal processing circuit of claim 1, further including providing at least one additional wireless power transmitter; and providing at least one additional power supply; and
   positioning said additional wireless power transmitter at an alternate distance from said wireless power receiver such that said wireless power receiver is receiving power from said additional wireless power transmitter; and
   increasing said alternate distance between said additional wireless power transmitter and said wireless power receiver; and
   decreasing said alternate distance between said additional wireless power transmitter and said wireless power receiver.

3. The method of modulating a signal passing through a signal processing circuit of claim 1, further including: providing a means to physically manipulate said variable load.

4. The method of modulating a signal passing through a signal processing circuit of claim 1, further including: providing a means to electronically manipulate said variable load.

5. A device for modulating a signal passing through a signal processing circuit comprising:
- at least one wireless power transmitter, wherein an input of said at least one wireless power transmitter is electrically connected to a primary power supply at a first connection; and
- at least one wireless power receiver, wherein an output of said at least one wireless power receiver is electrically connected to a power input of said signal processing circuit at a second connection; and
- wherein said wireless power transmitter is located at a distance from said wireless power receiver such that said wireless power receiver receives power from said wireless power transmitter; and
- wherein increasing said distance between said wireless power transmitter and said wireless power receiver reduces power transmitted to said signal processing circuit; and
- wherein decreasing said distance between said wireless power transmitter and said wireless power receiver increases power transmitted to said signal processing circuit; and
- at least one parallel circuit that contains a variable load coupled between said first connection and said second connection; and
- said signal processing circuit receives an unprocessed input signal and provides a processed output signal, wherein said signal processing circuit modulates said input signal based at least on the power transmitted to said signal processing circuit.

6. The device for modulating a signal passing through a signal processing circuit of claim 5, further including:
- at least one additional power supply; and
- at least one additional wireless power transmitter, wherein said additional wireless power transmitter is electrically connected to said additional power supply, and said additional wireless power transmitter is configured to transmit power to said wireless power receiver.

7. The device for modulating a signal passing through a signal processing circuit of claim 5, further including: means to physically manipulate said variable load.

8. The device for modulating a signal passing through a signal processing circuit of claim 5, further including: means to electronically manipulate said variable load.

* * * * *